F. L. HABERLE.
HANDLING MACHINE FOR BASKETS.
APPLICATION FILED MAY 4, 1909.

945,521.

Patented Jan. 4, 1910.
7 SHEETS—SHEET 1.

WITNESSES
F. G. Hackenberg
F. D. Ammen

INVENTOR
Fred L. Haberle.
BY Munn & Co.
ATTORNEYS

F. L. HABERLE.
HANDLING MACHINE FOR BASKETS.
APPLICATION FILED MAY 4, 1909.

945,521.

Patented Jan. 4, 1910.
7 SHEETS—SHEET 5.

WITNESSES

INVENTOR
Fred L. Haberle

ATTORNEYS

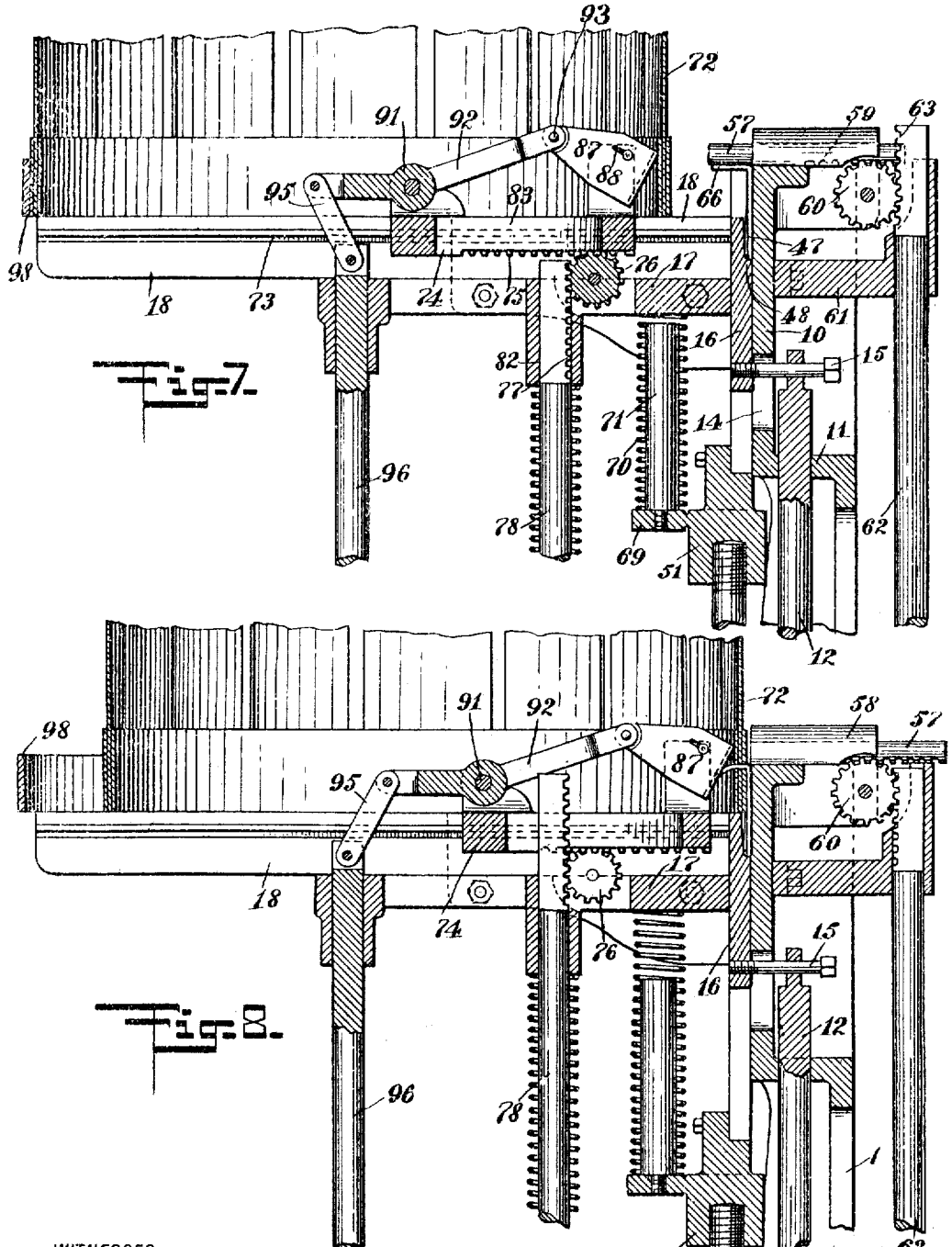

F. L. HABERLE.
HANDLING MACHINE FOR BASKETS.
APPLICATION FILED MAY 4, 1909.
945,521.
Patented Jan. 4, 1910.
7 SHEETS—SHEET 7.
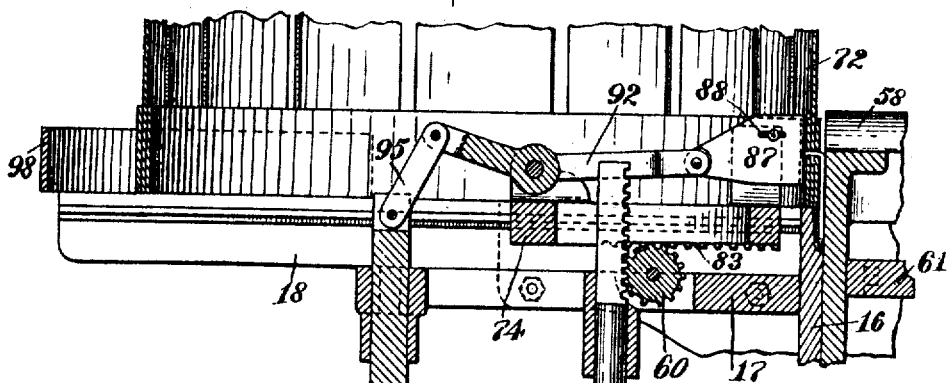
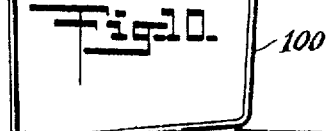
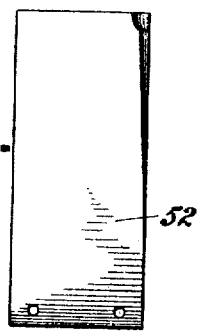
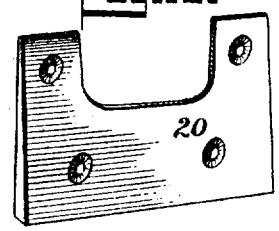
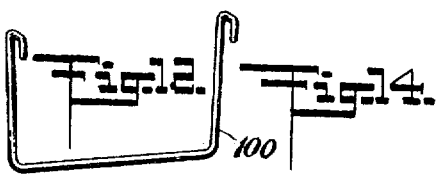
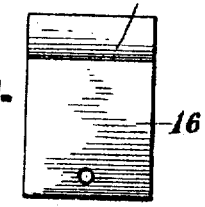
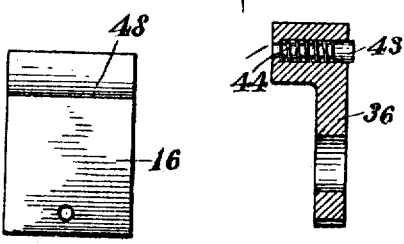
WITNESSES
F. J. Hackenberg.
F. D. ———
INVENTOR
Fred L. Haberle
BY Munn & Co.
ATTORNEYS

UNITED STATES PATENT OFFICE.

FRED LEOPOLD HABERLE, OF JACKSONVILLE, TEXAS.

HANDLING-MACHINE FOR BASKETS.

945,521. Specification of Letters Patent. Patented Jan. 4, 1910.

Application filed May 4, 1909. Serial No. 493,900.

*To all whom it may concern:*

Be it known that I, FRED L. HABERLE, a citizen of the United States, and a resident of Jacksonville, in the county of Cherokee and State of Texas, have invented a new and Improved Handling-Machine for Baskets, of which the following is a full, clear, and exact description.

This invention relates to a machine the purpose of which is to form and attach wire handles to baskets or similar articles.

The object of the invention is to produce a simple machine for this purpose which will operate automatically to feed in the wire stock, cut the wire to the proper length, and form it into a handle. The machine then operates to attach the handle to the basket and clenches it in position.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1:
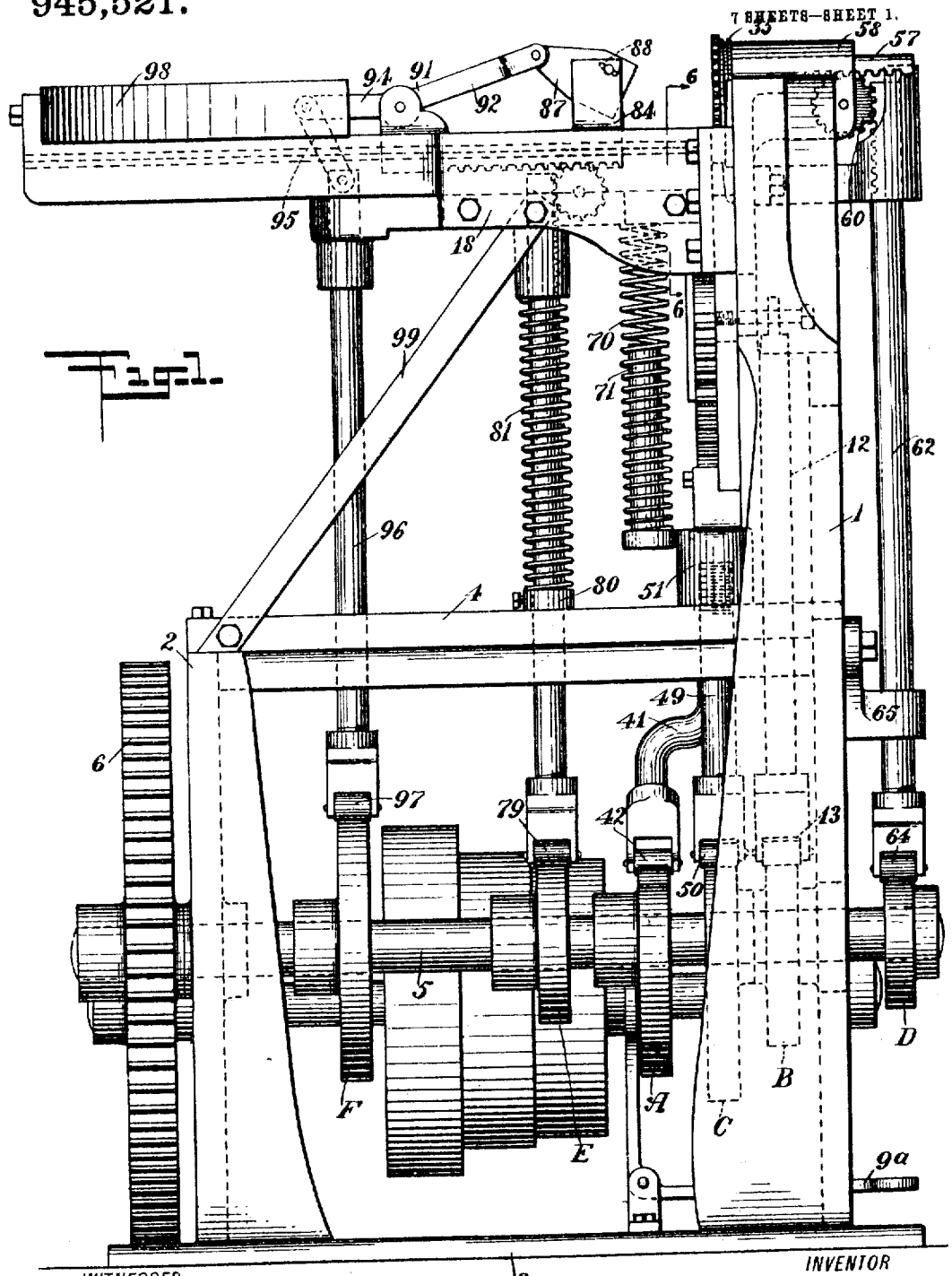
Figure 2:
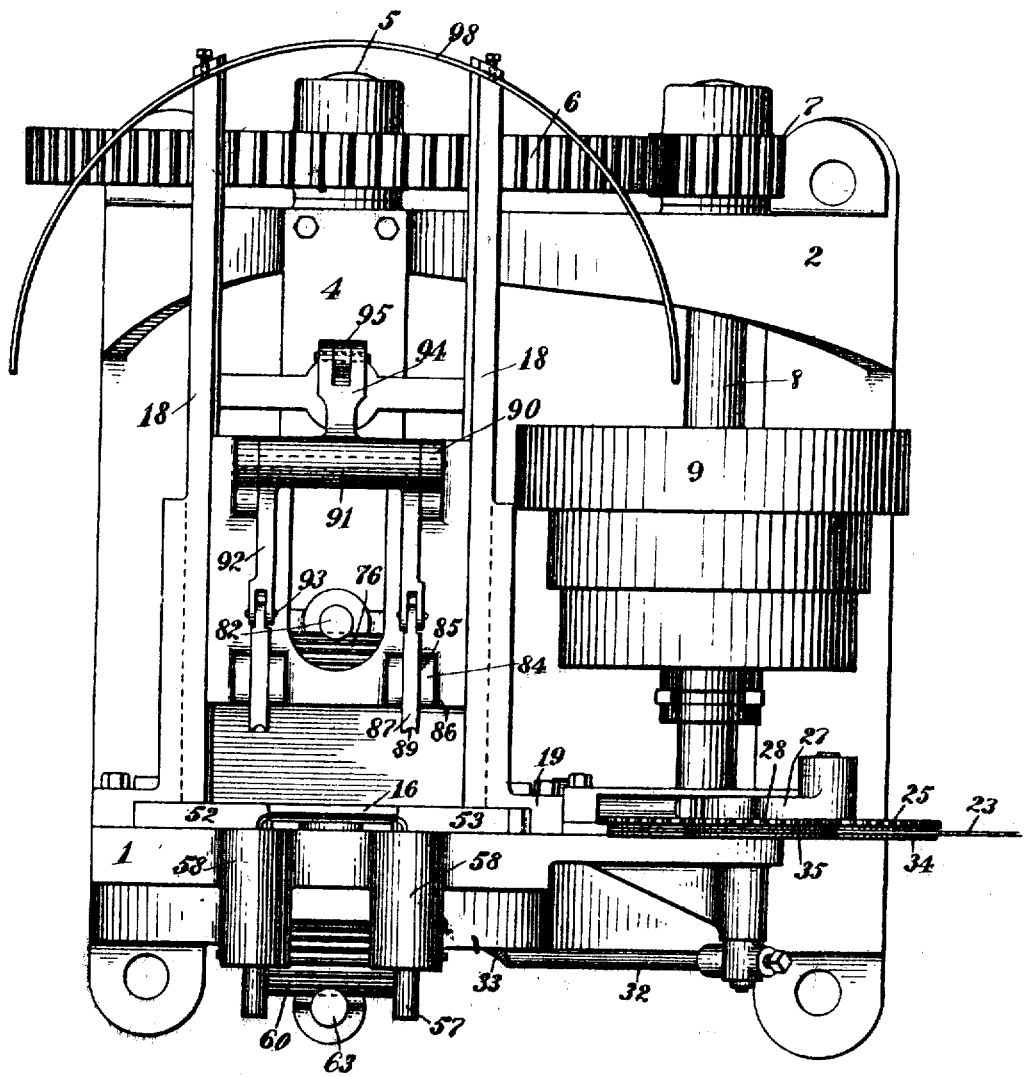
Figure 3:
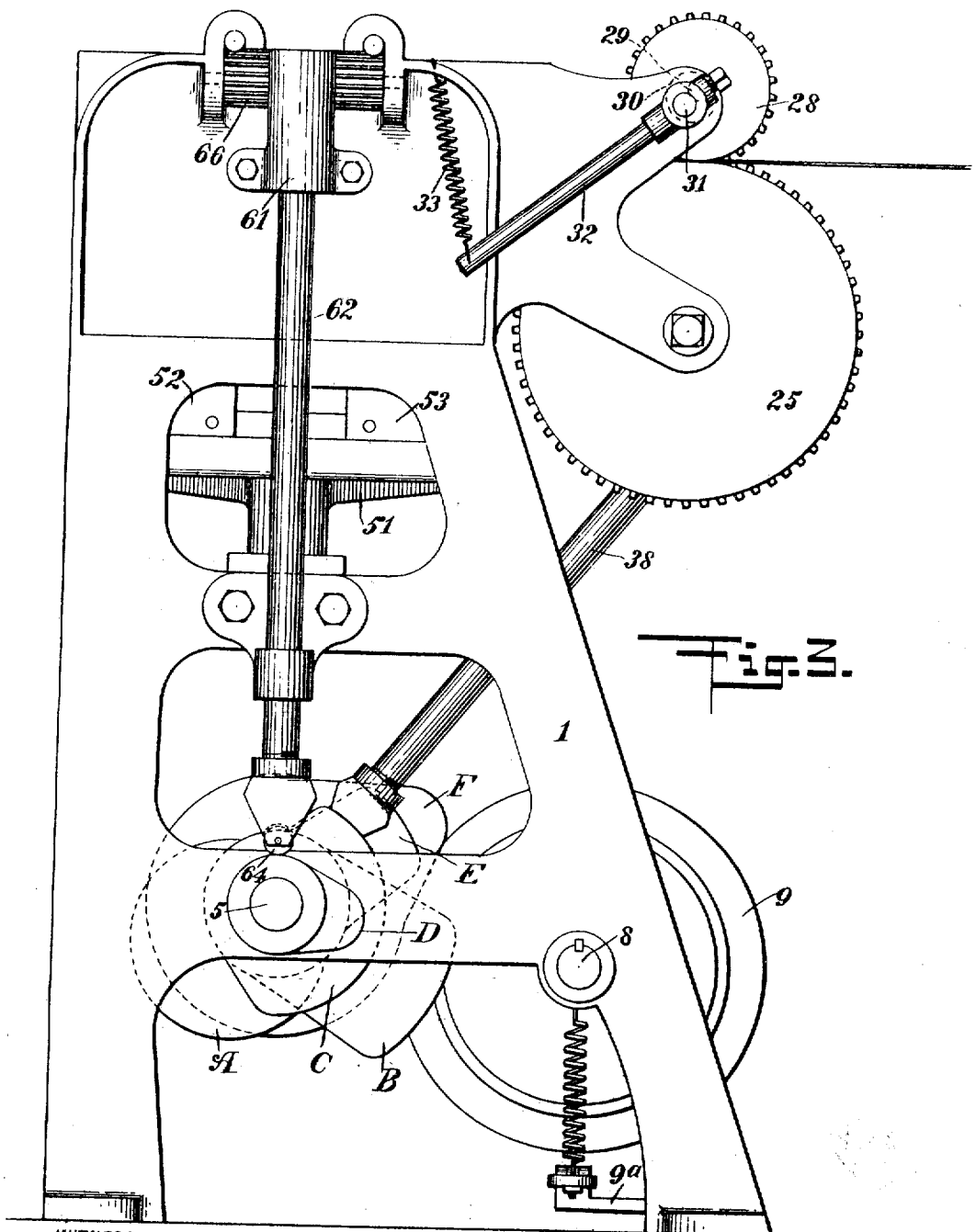
Figure 4:
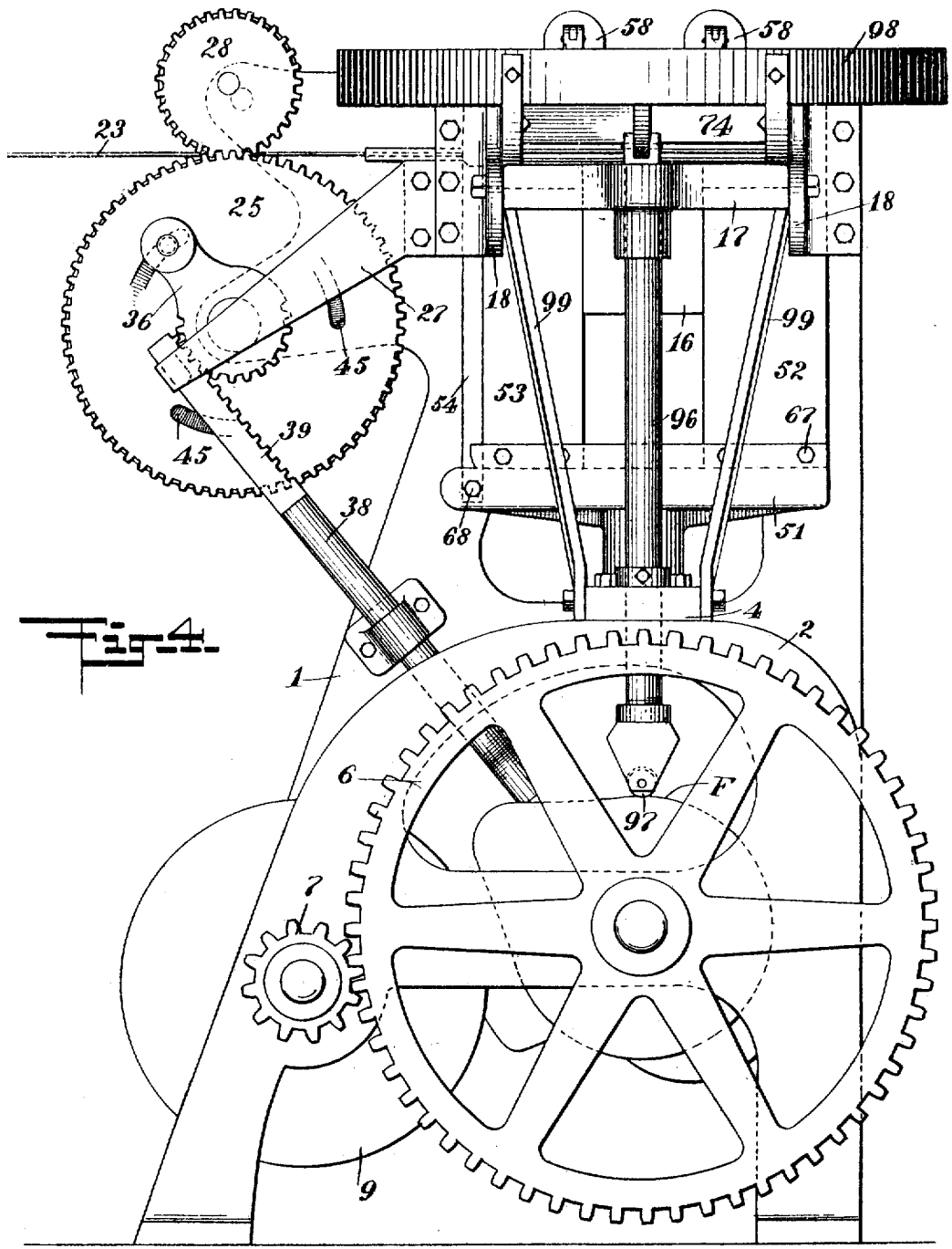
Figure 5:
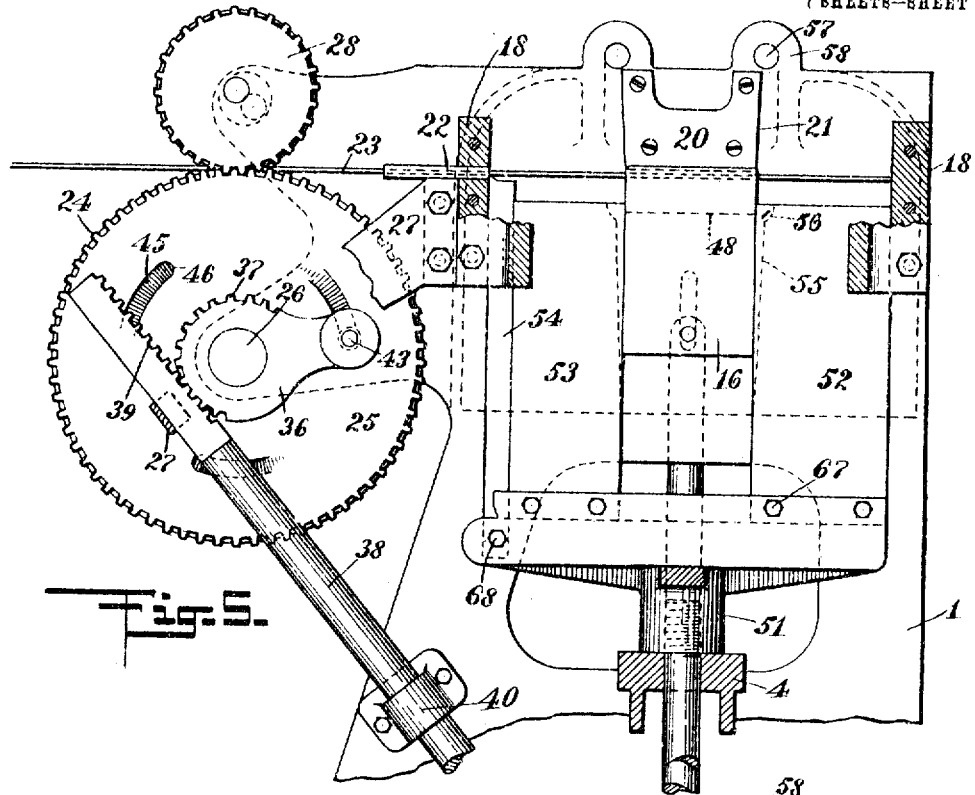
Figure 6:
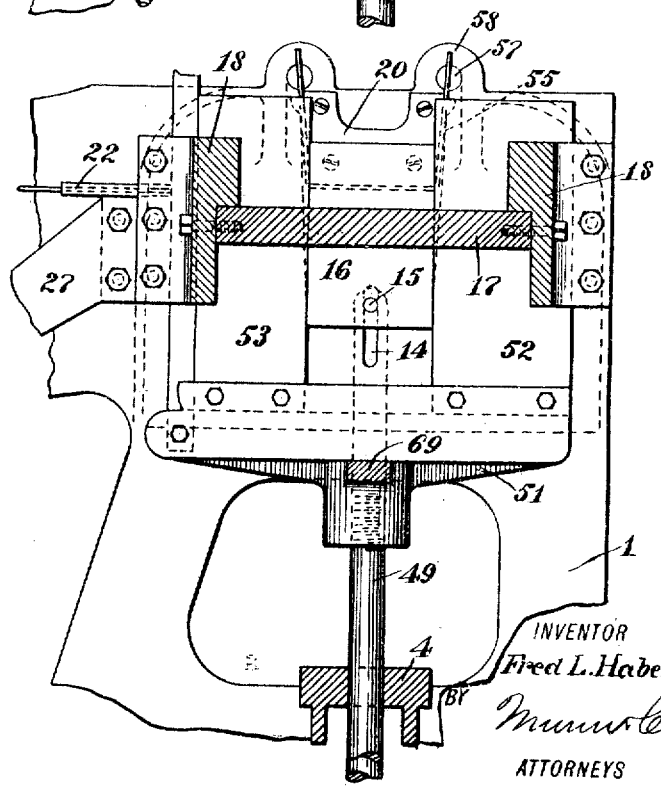

Figure 1 is a side elevation of the machine constructed according to my invention, and showing the same as viewed from the left side; Fig. 2 is a plan of the machine shown in Fig. 1; Fig. 3 is a front elevation of the machine; Fig. 4 is a rear elevation of the machine; Fig. 5 is a vertical section taken through the upper portion of the machine and illustrating the feeding mechanism and the cutting and forming mechanism for the handles, this section is taken looking toward the front; Fig. 6 is a similar cross section taken on the line 6—6 of Fig. 1, and illustrating more completely the mode of operation of the forming dies and the other mechanism for forming the handles; this section is taken looking toward the front; Fig. 7 is a vertical longitudinal section taken through the upper portion of the machine and illustrating the manner in which it supports and operates upon the basket, this view also illustrating a part of the forming mechanism for the handles; Fig. 8 is a view similar to Fig. 7, but showing the mechanism in a later phase or relation than that shown in Fig. 7; in this view a handle is represented as in engagement with the edge of the basket and in the act of being clenched; Fig. 9 is a view similar to Fig. 8, but showing the clenching operation being completed; Fig. 10 is a perspective showing the handle at the first stage of its formation; Fig. 11 is a perspective showing the handle in its second stage; Fig. 12 is a perspective showing a finished handle, but representing the same as detached from the basket; Fig. 13 is an elevation showing one of the two forming dies which are employed to bend the handles to form the arms of the handles; Fig. 14 is an elevation of a clamping jaw which holds the blank of the handle when it is being formed; Fig. 15 is a perspective of the fixed die or jaw against which the blank is clamped when the handle is being formed; Fig. 16 is a cross section taken through the end of the feed arm and illustrating a part of the feed mechanism.

Referring more particularly to the parts, the frame comprises a main housing 1 and an auxiliary housing 2 which projects up from a base plate 3. Near the upper portion of the auxiliary housing, a horizontal frame bar or guide bar 4 is provided, the forward end of which is attached to the main housing 1. Between the housings 1 and 2, a cam shaft 5 is mounted in a horizontal position, as shown, and upon this cam shaft six cams are provided, indicated by the letters A, B, C, D, E, and F. This cam shaft is adapted to be driven continuously by means of a main gear wheel 6 which is in turn driven by a pinion 7 carried on a driving shaft 8, said driving shaft being provided with a clutch pulley 9 of common form, operated by a spring-pressed pedal 9$^a$.

Referring now especially to Fig. 7 in connection with Figs. 1 and 2, the upper portion of the housing 1 is formed into a vertical guide plate 10, and below this guide plate 10 a horizontal web 11 is provided in the housing which acts as a guide for a cam rod 12. The lower extremity of the cam rod 12 is provided with a roller 13, and this roller rests upon the cam B so that the cam rod 12 is operated thereby. The guide plate 10 is provided with a vertical slot 14 through which extends a bolt 15, and the inner end of this bolt is attached to a clamping jaw 16, the purpose of which will be described more fully hereinafter. This jaw 16 slides up and down on the face of the guide plate 10, and its outer face lies adjacent to the inner end of a horizontal frame plate 17. This frame plate is secured to horizontal guide bars 18 which extend longitudinally of the machine, as indicated in Fig. 2. The forward ends of these guide bars 18 are formed with feet 19 which are bolted to the face of the frame plate 10, as shown. Just above the clamping jaw 16, as indicated most clearly in Figs. 5 and 6, on the face of the guide plate 10 I provide a fixed jaw or fixed die 20. The form of this die is clearly illustrated in Fig. 15. It presents a horizontal lower edge which extends transversely of the machine, and it presents side edges 21 which diverge slightly in an upward direction, as shown. One of the side guide bars 18, that is, the one at the right as viewed in Fig. 2, is provided with a guide sleeve 22 through which the wire stock is fed in a horizontal direction. This guide sleeve 22 is in substantial alinement with the lower edge of the fixed jaw 20. (See Fig. 5.) The wire 23 is fed through under the jaw periodically by means of feed mechanism 24. This feed mechanism comprises a main gear wheel 25 which is rotatably mounted on a stub shaft 26 mounted in a bracket 27 which is secured to the adjacent guide bar 18, as shown. Coöperating with this gear wheel 25 there is provided a feed pinion 28. The manner of mounting this pinion 28 is most clearly shown in Fig. 3. It is rotatably mounted on a pin 29 which is connected by a web 30 with a stub shaft 31. On this stub shaft 31, an arm 32 is rigidly attached, and the lower end of this arm is connected by a spring 33 with part of the frame so that the force of this spring exerts itself in pressing the pinion down toward the gear wheel 25. The gear wheel and pinion have meshing teeth, as shown, and in addition to this they are provided with grooves 34 and 35 through which the wire passes, as indicated. On account of the spring 33 a constant pressure on the wire is assured during the feeding operation, and at the same time the teeth are constantly in mesh with each other. The spring permits the feed pinion to adjust itself to different sizes of wire or slight variations in size of a normally uniform stock.

In order to advance the wire intermittently, the shaft 26 is provided with a feed arm 36 which has a segment 37 formed thereupon, as indicated. The teeth of this segment mesh with an inclined cam rod 38. The upper extremity of this cam rod 38 is formed into a rack 39, the teeth of which mesh with the teeth of the segment 37, as shown. In order to guide the cam rod 38, I provide a guide bracket 40 on the side of the main housing. The lower end of the cam rod 38 is offset, as indicated at 41 in Fig. 1, and below this offset, a roller 42 is provided which rolls on the face of the cam A. This cam A is the feed cam and when it operates the feed arm 36 it advances the stock into the machine.

The feed arm 36 near its outer extremity is provided with a feed pawl 43, the details of which are illustrated in Fig. 16. This feed pawl is pressed by means of a spring 44 toward the face of the gear wheel 25. This gear wheel is provided at suitable points with grooves 45, the bottoms of which incline so that on the forward ends of the grooves, shoulders or notches 46 are formed. These grooves are disposed circumferentially and may be three in number, disposed equidistantly, as shown; they are in alinement with the feed pawl 43. On the advancing movement of the arm, the feed pawl engages the shoulders 46 in succession so as to advance the gear wheel, but on the return movement the pawl rides out of the slots on the inclined bottom and engages the next slot to the rear with respect to the direction of rotation. In this way the stock is advanced through the guide sleeve 22 until the forward end of the wire abuts against the opposite guide bar 18, as indicated in Fig. 5. After this has taken place, the clamping jaw 16 moves up and clamps the blank between it and the fixed jaw 20. In this connection it should be observed that the clamping jaw 16 is in alinement with the jaw 20, but its face adjacent to the jaw 20 is provided with a recess 47 which receives the jaw 20. Below this recess a shoulder 48 is formed which engages the wire and clamps it against the lower edge of the fixed jaw 20, as indicated in Fig. 7. After the wire has been clamped in this way it is cut off so as form a blank and this blank is then bent to the required form. This part of the operation is accomplished by means of the cam C. This cam comprises a vertically disposed cam rod 49, the lower extremity of which is provided with a roller 50 rolling on the face of the cam, as indicated. The upper portion of this cam rod 49 is guided through the guide member 4, and to its upper end there is attached a cross head 51. This cross head is clearly shown in Figs. 5 and 6, and is provided with oppositely disposed plates 52 and 53, which plates constitute forming dies. Their adjacent edges slide along the vertical edges of the clamping jaw 16 and their outer edges lie adjacent to the guide bars 18. On the edge of the die 53 which is disposed adjacent to the feed mechanism, a knife 54 is attached, and the edge of this knife slides along the inner face of the adjacent guide bar 18 so as to cut off the stock which is fed into the machine; this forms the blank. It will be observed that the edge of the knife 54 is disposed slightly above the edges of the dies 52 and 53 so that the blank will be cut off before it is engaged by the upper edges of the forming dies. Fig. 5 illustrates the knife 54 in the act of cutting the stock to form the blank.

On the adjacent edges of the forming dies 52 and 53, tapered grooves 55 are provided, and at the point where these grooves 55 emerge upon the upper edges of the dies, enlargements or pockets 56 are formed which facilitate the bending of the blank without making the bend too abrupt, which might tend to divide the blank. After the knife 54 has cut the blank, the further upward movement of the die plates 52 and 53 bends the ends of the blank which project beyond the side edges of the fixed jaw 20 so that these outer portions are bent upwardly against the edges 21 of the fixed die, as indicated in Fig. 6. It should be noted that the fixed jaw 20 is disposed centrally between the two guide bars 18 so that the parts of the blank which project from the edges of the fixed die are of equal length.

When the dies 52 and 53 have operated as indicated in Fig. 6, the upper ends of the blank project across the ends of two plungers 57. These two plungers 57 are mounted in suitable guides 58 so as to move in a horizontal direction at the front of the machine. In order to operate these plungers their lower sides are formed with racks 59, and these racks mesh with a horizontal roll pinion 60. This pinion is rotatably mounted in the upper part of the housing in the vicinity of the guide plate 10, as indicated in Fig. 7. Adjacent this point a bracket 61 is provided and in this guide bracket a cam rod 62 is guided vertically. The upper end of this cam rod 62 is formed with a rack 63 which meshes with the roll pinion, as shown. The lower end of the cam rod 62 is provided with a roller 64 which runs on the face of the cam D, and near the lower end of the cam rod 62, a guide bracket 65 is attached to the forward face of the housing 1, as shown. As suggested, these plungers 57 are operated at the proper time so that they advance toward the rear of the machine. In this way they engage the free extremities of the blank which project across their faces, and they bend down these ends so as to form spurs 66, as indicated in Fig. 7. In this connection it should be noted that the grooves 55 are undercut in the edges of the dies 52 and 53 so that the upper edges of these dies form an edge across which the plungers bend the blank to form the spurs. This is clearly indicated in Fig. 6.

Referring again to the dies 52 and 53, it will be noted that the guide bars 18 adjacent to the feet 19, project over the edges of the dies so as to hold them against the guide plate 10, in this way forming guides for the dies, as will be readily understood. The dies 52 and 53 are removed from the cross head 51 by removing the bolts 67 which attach them thereto, the knife 54 is also secured by a removable bolt 68.

In order to return the cross head 51 to its normal depressed position, it is provided on one side with an upwardly projecting spring seat 69, as indicated in Fig. 7, and on this spring seat 69, a coil spring 70 seats. The upper end of this spring thrusts against the under face of the frame plate 17, and the spring is held in position by vertically disposed stems 71 adjacent to the spring seat.

After the spurs 66 have been formed, the plungers 57 withdraw and the basket 72, which is supported on the guide bars 18 in an inverted position, is advanced so as to force the spurs 66 through its edge. The mechanism for this purpose will now be described: The inner faces of the guide bars 18 are provided with guide grooves 73, and these guide grooves support and guide a slide 74, which slide is in the form of an open frame having racks 75 formed under its side bars. These racks mesh with a roll pinion 76 which is rotatably mounted in the frame plate 17. This roll pinion is actuated by means of a rack 77 formed on the upper end of a cam rod 78. This cam rod is provided at its lower end with a cam roller 79 which runs on the face of the cam E, as indicated in Fig. 1. At a suitable point on the cam rod, a collar 80 is provided, and a spring 81 presses against this collar at its lower end, and at its upper end presses against the side of a guide 82 for the rod which is formed on the under side of the frame plate 17. When the cam rod 78 moves vertically its upper extremity slides through the opening 83 which is formed in the slide 74, as will be readily understood. The forward extremity of the slide 74 is provided with vertically projecting bifurcated ears 84, and through the gaps 85 between the ears horizontal pins 86 extend. On these pins, clenchers 87 are mounted. These clenchers are in the form of plates having the shape indicated. Each clencher plate is attached to its pin by means of a slot 88 which extends parallel to its lower edge, and at right angles to its forward edge. At these forward edges a vertical groove 89 is formed in each clencher plate.

At the rear extremity of the slide 74, ears 90 are provided, between which there is pivotally mounted a rocker 91. This rocker has arms 92 which extend forwardly and are pivotally attached by pins 93 with the rear extremities of the clencher plates 87. This rocker 91 has a rearwardly extending driving arm 94, and to the rear extremity of this arm a link 95 is attached. The lower end of this link 95 is pivotally attached to the upper extremity of a cam rod 96 which is guided through the frame plate 17, as shown. The lower end of this cam rod 96 is provided with a roller 97, and this roller runs upon the face of the cam F. At the proper time the cam rod 78 moves upwardly and this advances the slide 74. The inner side of the edge of the basket which is adjacent to the spurs 66 is then engaged by the upper parts of the forward edges of the clencher plates 87. When this movement is taking place, the clencher plates are disposed in an inclined position so that their forward edges incline away from the edge of the basket toward their lower extremities. As the slide advances, the adjacent edge of the basket is presented forcibly to the spurs 66 so that they puncture the material and pass completely through it. The extremities of the spurs 66 then engage the grooves 89 of the forward edges of the clencher plates, as indicated in Fig. 8. The next movement of the clencher plates is to clench the spurs to the inner side of the basket rim. This act of the clencher plates is caused by the cam rod 96 which moves upwardly. As it moves upwardly the link 95 actuates the rocker 91 and moves the arms 92 down into a substantially horizontal position, as indicated in Fig. 9. This advances the clencher plates on their guide pins 86 so that their forward edges come into a substantially vertical plane adjacent to the inner side of the basket rim. In doing this they bend the ends of the spurs down so as to clench them, as clearly shown. On this account it will be noted that the clencher plates have a double function, first they operate as guides to receive the spurs after they penetrate the edge of the basket and present themselves in an inclined position at this time so as to start the bending of the spurs; after this they assume a different position which clenches the spurs firmly against the edge of the basket.

In order to assist in positioning the basket, the rear extremities of the guide bars 18 have a semicircular hook 98 attached thereto. This hook forms a holding frame which assists the operator in his work, it being understood that the operator should stand at the front of the machine, that is, on the side opposite to the open side of the hook.

In order to give the guide bars 18 increased rigidity, I connect the rear end of the guide bar 4 with the guide bars 18 by means of inclined braces 99, as shown in Fig. 1.

The mode of operation of the entire machine will now be briefly described: The cam shaft 5 is driven continuously through the gears 7 and 6. In the complete cycle of the machine the first cam to operate is the cam A, which operates the feed mechanism 24 by reciprocating the cam rod 38. Each upward movement of the cam rod advances the proper length of stock between the gear wheel 25 and the pinion 28 so that sufficient stock to form a blank passes into the space between the guide bars 18 under the lower edge of the fixed jaw 20. The cams B and C then come into operation. The cam B operates the movable jaw 16 so as to clamp the blank against the fixed jaw 20 at the same time the stock is cut off by the knife 54 to form the blank. It should be noted that the upper edge of the moving jaw 16 always projects across the lower edge of the fixed jaw 20 so that the blank can not fall out of position after it has been cut by the knife. As the moving jaw 16 moves up to clamp the blank, the dies 52 and 53 come into operation, being actuated by the cam C. The upper edges of these dies engage the projecting parts of the blank and bend it up to form the arms 100 of the handles. The arms are formed against the edges 21 of the fixed jaw 20 and the dies 52 and 53 remain in their elevated position. The plungers 57 are advanced by the cam D and form the spurs 66 of the handles. The dies then drop down out of the way. As the plungers 57 withdraw, the cam E operates to advance the slide 83, which advances the basket so as to fix the handle to the basket, the spurs 66 penetrating the edge of the basket as described. The plungers stiffen the spurs and keep them straight as they penetrate the basket. After the spurs are forced home the cam F then comes into operation so as to rock the clencher plates at their guide pins, forcing the ends of the spurs down, and clenching them against the inner side of the basket. This rocking operation of the clenchers may occur simultaneously with the advancing movement of the slide, and in fact a certain rocking of the clenchers will occur necessarily as the slide advances.

Having thus described my invention, I claim as new and desire to secure by Letters Patent,—

1. In a machine of the class described, in combination, a frame, feed mechanism for advancing the stock, mechanism for cutting the blank, means for bending the blank to form spurs thereupon, projecting in the same direction, means for advancing the basket to impale the edge thereof on the spurs, and means for clenching said spurs.

2. In a machine of the class described, in combination, a frame, a fixed die mounted therein, means for advancing the stock under the lower edge of said die, forming dies moving upwardly adjacent to the side edges of said fixed die and adapted to form the arms of the handle, means for forming spurs on the arms of the handle, projecting in the same direction, means for advancing the basket so as to impale the same upon said spurs, and means for clenching said spurs.

3. In a machine of the class described, in combination, a frame, a pair of guide bars, a fixed die mounted substantially midway between said guide bars, means for advancing the stock across the edge of said fixed die, a jaw coöperating with said fixed die to hold the blank, forming dies guided to slide adjacent to the edges of said jaw and having grooves adapted to bend the blank, means for cutting the stock to form the blank, means for forming spurs projecting substantially at right angles to the plane of the handle, and means for attaching said spurs to the basket.

4. In a machine of the class described, in combination, a frame, a fixed die mounted therein, a jaw coöperating with said die to hold the blank, and forming dies adapted to slide along the edges of said jaw and having grooves adjacent to the edges thereof, said grooves affording means for initiating a bending movement and bending the projecting extensions of the blank along the edges of said fixed die.

5. In a machine of the class described, in combination, a frame, a fixed die, means for advancing stock across the lower edge of said die, means for cutting off the stock to form a blank, a moving jaw coöperating with said fixed die to hold the blank, and forming dies adapted to slide along the side edges of said fixed die and having grooves adapted to initiate a bending movement and bend the over-hanging extensions of the blank along said fixed die.

6. In a machine of the class described, in combination, a frame, a fixed die, a movable jaw coöperating therewith to hold the blank, means for advancing the stock under said die, a movable cross head, forming dies carried by said cross head and coöperating with the side edges of said fixed die to initiate a bending movement and form the arms of the handle from the blank, and a knife carried by said cross head for cutting the blank from the stock.

7. In a machine of the class described, in combination, a frame, a fixed die mounted therein, means for advancing the stock under the lower edge of said die, a movable jaw coöperating with said die to hold a blank, a cross head, forming dies having grooves in their edges lying adjacent to the side edges of said jaw and adapted to advance along the side edges of said die said grooves affording means for initiating a bending movement to form the arms from the blank, and a knife carried by said cross head and affording means for cutting a blank from the stock.

8. In a machine of the class described, in combination, a main feed wheel having a groove in the face thereof, a second feed wheel mounted to rotate on an eccentric axis, and a spring constraining said second feed wheel to rotate on said eccentric axis.

9. In a machine of the class described, in combination, a main feed wheel, a presser feed wheel coöperating therewith to advance the stock, an arm rotatably mounted on the axis of said main feed wheel, a pawl carried by said arm, said arm having a segment formed thereupon, a feed rod having a rack meshing with said segment, and means for reciprocating said feed rod, said main feed wheel having means engaging with said pawl.

10. In a machine of the class described, in combination, a main feed wheel, a second feed wheel coöperating therewith to advance the stock, said main feed wheel presenting abrupt shoulders and inclined faces adjacent thereto, an arm rotatably mounted on the axis of said main feed wheel, a spring-pressed pawl mounted in said arm coöperating with said shoulders, and means for rocking said arm.

11. In a machine of the class described, in combination, a fixed die, means for positioning a blank along the edge thereof, forming dies adapted to engage the extensions of said blank beyond the side edges of said fixed die, means for advancing said forming dies so that their adjacent edges pass along the side edges of said fixed die to form the arms of the handle, and means for bending the extremities of said arms across said forming dies to form the spurs of the handle.

12. In a machine of the class described, in combination, a frame, a fixed die mounted thereupon, means for positioning a blank along the edge of said die, forming dies coöperating with said first die and sliding upwardly along the side edges to form the arms of the blank, and members guided in a plane substantially at right angles to the plane of movement of said forming dies and having their side faces disposed adjacent to the forward edges of said forming dies, said members affording means for forming spurs on the arms by bending the arms across the edges of said forming dies.

13. In a machine of the class described, in combination, a frame, a fixed die, means for positioning a blank under the lower edge of said die, forming dies adapted to slide along the side edges of said fixed die and having under-cut grooves on the edges thereof adjacent to said fixed die, said under-cut grooves operating to form the arms of the handle, and members adapted to advance and engage the extremities of said arms and affording means for bending the arms across the edges of said forming dies to form the spurs of the handle.

14. In a machine of the class described, in combination, a fixed die having a longitudinal edge and side edges, forming dies sliding along said side edges and having grooves adjacent thereto operating to form arms in the blank when laid along said longitudinal edge, and a pair of plungers adapted to advance and engage the extremities of said arms and adapted to bend the same across the edges of said forming dies.

15. In a machine of the class described, in combination, a frame, a fixed die mounted thereupon having a longitudinal edge and side edges, said longitudinal edge being adapted to receive a blank, forming dies adapted to move along said side edges and having grooves adjacent to said side edges adapted to bend the ends of the blank to form arms, and members adapted to advance across the plane of movement of said forming dies and lying adjacent to the forward edges thereof, said members affording means for forming the spurs of the handle.

16. In a machine of the class described, in combination, means for supporting a basket, means for forcing the spurs of the handle through the edge of said basket, clencher plates lying in the path of the spurs as they pass through the basket and presenting inclined edges in the path of the spurs as they are inserted adapted to deflect said spurs initially by the force which drives the spurs through the basket, and means for actuating said clencher plates to complete the clenching of the spurs against the basket edge.

17. In a machine of the class described, in combination, means for supporting a handle blank having spurs, means for supporting and advancing a basket so as to impale the edge thereof on said spurs, clencher plates mounted to rock and normally presenting inclined edges to receive said spurs and deflect the ends thereof, means for rocking said clencher plates to complete the bending movement of said spurs, and means for advancing said clencher plates to said holding means in the clenching operation.

18. In a machine of the class described, in combination, a frame, means for holding a blank with laterally projecting spurs, means for supporting and advancing a basket so as to impale the edge thereof on said spurs, clencher plates adjacent to the edge of said basket presenting an inclined edge receiving and initially bending the ends of said spurs, and means for rocking the edge of said clencher plates to clench said spurs.

19. In a machine of the class described, in combination, a frame having members for supporting a basket, a slide guided on said members, clencher plates movably mounted on said slide, means for advancing said slide to advance the basket to impale the edge thereof on the spurs of the handle, and means for moving said clencher plates with respect to said slide so as to clench the spurs on the basket edge.

20. In a machine of the class described, in combination, a frame, guide bars attached thereto, a slide moving on said guide bars, clencher plates movably mounted on said slide, said guide bars affording means for supporting a basket in an inverted position with the edge thereof adjacent to said clencher plates, means for supporting a handle with spurs in alinement with said clencher plates, and means for advancing said slide to impale the basket edge and actuating said clencher plates to clench the spurs thereafter.

21. In a machine of the class described, in combination, a frame, a pair of guide bars attached thereto, a slide movably mounted on said guide bars, clencher plates mounted to rock and slide upon said slide, means for holding a blank with spurs in alinement with said clencher plates, means for advancing said slide to impale the basket edge on said spurs, and means for rocking and sliding said clencher plates to clench the spurs on the basket edge.

22. In a machine of the class described, in combination, a frame, a slide, means for guiding said slide to reciprocate, clencher plates having a pin and slot connection with the forward portion of said slide, means for supporting a handle with spurs projecting toward said clencher plates and in alinement therewith, means for advancing said slide to impale the basket edge on said spurs, and means for moving said clencher plates on said pin and slot connection to clench the spurs on the basket edge.

23. In a machine of the class described, in combination, a frame, a slide, means for guiding said slide to reciprocate, a rocker mounted on said slide, clencher plates having a pin and slot connection with said slide and pivotally connected with said rocker, means for holding a handle with spurs projecting toward said clencher plates and in alinement therewith, means for impaling the basket edge on said spurs, and means for actuating said rocker to clench the spurs on said basket edge.

24. In a machine of the class described, in combination, a frame, a pair of guide bars attached thereto, a slide reciprocating on said guide bars, clencher plates having a pin and slot connection with said slide, a rocker mounted to rock on said slide and pivotally connected with said clencher plates, means for holding a handle with spurs projecting toward said clencher plates, means for advancing said slide to impale the basket edge on said spurs, and means for actuating said rocker to clench the spurs by means of said clencher plates.

25. In a machine of the class described, in combination, means for supporting a basket, a clencher frame, clencher plates mounted on said clencher frame, means for impaling the basket edge on the handle with the handle spurs in alinement with said clencher plates, said clencher plates affording means for initially bending the spurs by the impaling force and means for actuating said clencher plates thereafter to clench the spurs on the basket edge.

26. In a machine of the class described, in combination, a clencher frame, means for supporting a basket with its edge adjacent to said frame, clencher plates movably mounted on said clencher frame and presenting inclined edges adjacent to the basket edge, means for impaling the basket edge on the handle spurs, and means for moving said clencher plates thereafter so as to bring the forward edges thereof completely against the basket edge to clench the spurs.

27. In a machine of the class described, in combination, means for supporting a basket, a clencher frame, clencher plates movably mounted on said clencher frame and normally presenting their forward edges inclined adjacent to the basket edge, means for impaling the basket edge on spurs alining with said clencher plates, and means for rocking said clencher plates so as to bend the forward ends of the spurs against the basket edge.

28. In a machine of the class described, in combination, means for supporting a basket, a clencher frame disposed adjacent to the basket edge, clencher plates having a pin and slot connection with said clencher frame, a rocker mounted on said clencher frame, means for impaling the basket edge on a handle having spurs in alinement with said clencher plates, and means for rocking said rocker for clenching the edges of the spurs against the basket edge by means of said clencher plates.

29. In a machine of the class described, in combination, a frame, means for supporting a handle with laterally projecting spurs, a slide, means for reciprocating said slide toward the position of said handle, clencher plates having a pin and slot connection with said slide and alining with the spurs of the handle, a rocker mounted to rock on said slide and pivotally attached to said clencher plates, and independent means for actuating said rocker to control said clencher plates.

30. In a machine of the class described, in combination, a frame, a slide mounted to reciprocate thereupon, said slide having a rack formed on the under side thereof, a pinion meshing with said rack and adapted to advance said slide, a shaft, means for driving said pinion from said shaft, clencher plates mounted on said slide and adapted to clench the handle spurs on the basket edge, means mounted on said slide for moving said clencher plates with respect to said slide, and means for actuating said last means from said shaft.

31. In a machine of the class described, in combination, a frame, a slide, means for guiding said slide to reciprocate, said slide having a rack formed thereupon, a pinion meshing with said rack, a shaft, a cam rod driven from said shaft and having a rack meshing with said pinion, clencher plates having a pin and slot connection with said slide and presenting clenching edges to the spurs impaling the basket, a rocker mounted on said slide and pivotally connected with said clencher plates, and means for rocking said rocker from said shaft.

32. In a machine of the class described, in combination, a frame, a slide, means for guiding said slide to reciprocate, said slide having racks formed at the side edges thereof, a roll pinion meshing with said racks and adapted to reciprocate said slide, a rack meshing with said roll pinion between said first racks, means for reciprocating said last-named rack to reciprocate said slide, clencher plates carried by said slide, and independent means for moving said clencher plates with respect to said slide.

33. In a machine of the class described, in combination, a frame, a fixed die supported thereby movable dies coöperating with said fixed die to form the arms of the handle from the blank thereof, plungers adapted to engage the extremities of the arms of the handle to bend the same and having racks formed on the sides thereof, a roll pinion meshing with said racks, and a driving rack meshing with said roll pinion.

34. In a machine of the class described, in combination, a frame, means for forming arms upon the handle blank, means for forming spurs on the arms of the handle blank, a slide, means for reciprocating said slide, clencher plates movably mounted on said slide, and means for controlling said clencher plates with respect to said slide.

In testimony whereof I have signed my name to this specification in the presence of two subscribing witnesses.

FRED LEOPOLD HABERLE.

Witnesses:
MARTIN EARLE,
ALLEN EARLE.